(12) United States Patent
Collier et al.

(10) Patent No.: US 7,452,068 B2
(45) Date of Patent: Nov. 18, 2008

(54) EYEWEAR WITH CLIP-ON FRAME AND LENS

(75) Inventors: Michael Collier, Beaverton, OR (US); Kyle Schepke, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 291 days.

(21) Appl. No.: 11/273,599

(22) Filed: Nov. 14, 2005

(65) Prior Publication Data

US 2007/0109490 A1    May 17, 2007

(51) Int. Cl.
    *G02C 9/00* (2006.01)
(52) U.S. Cl. .......................................... 351/47; 351/57
(58) Field of Classification Search ............. 351/47, 351/48, 57, 58, 44, 86, 83, 103, 106, 138, 351/136
    See application file for complete search history.

(56) References Cited

U.S. PATENT DOCUMENTS

| | | |
|---|---|---|
| 2,362,725 A | 11/1944 | Slotsky |
| 2,397,243 A | 3/1946 | Cooper, Jr. |
| 2,444,498 A | 7/1948 | Cochran |
| D150,924 S | 9/1948 | Bright |
| 2,534,655 A | 12/1950 | Baratelli |
| 2,563,125 A | 8/1951 | Malcom, Jr. |
| 2,571,704 A | 10/1951 | Gilden |
| 2,607,919 A | 8/1952 | Stegeman |
| 2,770,806 A | 11/1956 | Moeller |
| 2,825,267 A | 3/1958 | Gagnon |
| D182,459 S | 4/1958 | Eisler |
| 3,066,573 A | 12/1962 | Moeller |
| 3,233,249 A | 2/1966 | Baratelli et al. |
| 3,517,393 A | 6/1970 | Beauchef |
| 3,756,704 A | 9/1973 | Marks |
| 3,838,914 A | 10/1974 | Fernandez |
| 4,317,240 A | 3/1982 | Angerman et al. |
| 4,674,851 A | 6/1987 | Jannard |
| D293,450 S | 12/1987 | Jannard |
| 4,730,915 A | 3/1988 | Jannard |
| 4,810,080 A | 3/1989 | Grendol et al. |
| 4,824,233 A | 4/1989 | Jannard |
| 4,951,322 A | 8/1990 | Lin |
| D324,394 S | 3/1992 | Jannard |
| 5,249,001 A | 9/1993 | Jannard |
| 5,387,949 A | 2/1995 | Tackles |
| 5,467,148 A | 11/1995 | Conway |
| 5,555,037 A | 9/1996 | Canavan |
| 5,576,775 A | 11/1996 | Bolle |
| 5,581,312 A | 12/1996 | Chen |

(Continued)

FOREIGN PATENT DOCUMENTS

EP    1156356 A1    4/2001

(Continued)

OTHER PUBLICATIONS

International Search Report, PCT/2006/060854.

*Primary Examiner*—Hung X Dang
(74) *Attorney, Agent, or Firm*—Banner & Witcoff, Ltd.

(57) ABSTRACT

Eyewear includes an outer frame having a right temple arm and a left temple arm. An outer lens is secured to the outer frame. An inner frame is removably secured to one of the outer frame and the outer lens. An inner lens has a nosepiece and is secured to the inner frame.

22 Claims, 3 Drawing Sheets

U.S. PATENT DOCUMENTS

| | | |
|---|---|---|
| 5,760,868 A | 6/1998 | Jannard et al. |
| 5,790,230 A | 8/1998 | Sved |
| 5,841,505 A | 11/1998 | Bolle |
| 5,929,963 A | 7/1999 | McNeal |
| 5,969,787 A | 10/1999 | Hall et al. |
| 6,086,199 A | 7/2000 | Holland et al. |
| 6,196,681 B1 | 3/2001 | Canavan |
| 6,367,927 B2 | 4/2002 | Yang |
| 6,386,705 B1 | 5/2002 | Chen |
| 6,517,202 B2 | 2/2003 | Huang |
| 6,783,235 B1 | 8/2004 | Lin |
| 6,991,333 B2 | 1/2006 | Van Atta et al. |
| 7,147,321 B2 | 12/2006 | Van Atta |
| 7,204,589 B2 * | 4/2007 | Pieterman .................... 351/47 |
| 2005/0179856 A1 | 8/2005 | Van Atta et al. |

FOREIGN PATENT DOCUMENTS

| | | |
|---|---|---|
| EP | 1184712 A1 | 8/2001 |
| FR | 2681442 A1 | 3/1993 |
| IT | 01279258 | 12/1997 |
| IT | 01279337 | 12/1997 |
| IT | 00245516 | 3/2002 |
| IT | 01311533 | 3/2002 |
| WO | 0036453 | 6/2000 |
| WO | 2005081043 A1 | 9/2005 |

* cited by examiner

EYEWEAR WITH CLIP-ON FRAME AND LENS

FIELD OF THE INVENTION

This invention relates generally to eyewear, and, in particular, to eyewear including a clip-on frame and associated lens.

BACKGROUND OF THE INVENTION

Eyewear is well known for use in many activities including athletic activities, such as biking, skiing, and running. The eyewear may have a multitude of constructions. For example, the eyewear may have a wraparound lens secured to a frame, commonly referred to as a shield lens, or it may have two distinct lenses secured to a frame. Performance-type wraparound lenses are often worn by athletes and other users to provide blocking of the sun's rays and protection from wind, water spray, etc. However, user's with the need for prescription lenses typically cannot use such a lens without using contact lenses or sacrificing accurate vision.

It would be desirable to provide eyewear that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide eyewear with inner and outer lenses. In accordance with a first aspect, eyewear includes an outer frame having a right temple arm and a left temple arm. An outer lens is secured to the outer frame. An inner frame is removably secured to one of the outer frame and the outer lens. An inner lens has a nosepiece and is secured to the inner frame In accordance with another aspect, eyewear includes an outer frame formed of a central member, a left connecting member secured to the central member and a left temple arm secured to the left connecting member. A right connecting member is secured to the central member. A right temple arm is secured to the right connecting member. An outer lens is secured to the left connecting member and the right connecting member. An inner frame is removably secured to the outer lens. An inner lens has a nosepiece and is secured to the inner frame.

In accordance with a further aspect, eyewear includes an outer frame having a central member and a left connecting member secured to the central member. A left temple arm is pivotally secured to the left connecting member. A right connecting member is secured to the central member. A right temple arm is pivotally secured to the right connecting member. An outer lens is removably secured to the left connecting member and the right connecting member. An inner frame is removably secured to the outer lens. A left inner lens is removably secured to the inner frame. A right inner lens is removably secured to the inner frame. A nosepiece is secured to the inner frame. A left bumper pad is positioned between the inner frame and the outer lens, and a right bumper pad is positioned between the inner frame and the outer lens.

Substantial advantage is achieved by providing eyewear with an outer frame and an outer lens and an inner frame and an inner lens. In particular, certain embodiments allow a user to wear prescription lenses that are secured to an outer lens to provide protection for the user's eyes, e.g., sun and wind protection.

These and additional features and advantages disclosed here will be further understood from the following detailed disclosure of certain embodiments.

BRIEF DESCRIPTION OF THE DRAWINGS

FIG. 3 is a perspective view of an alternative embodiment of a nosepiece for use with the eyewear of FIG. 1.

Figure 1:
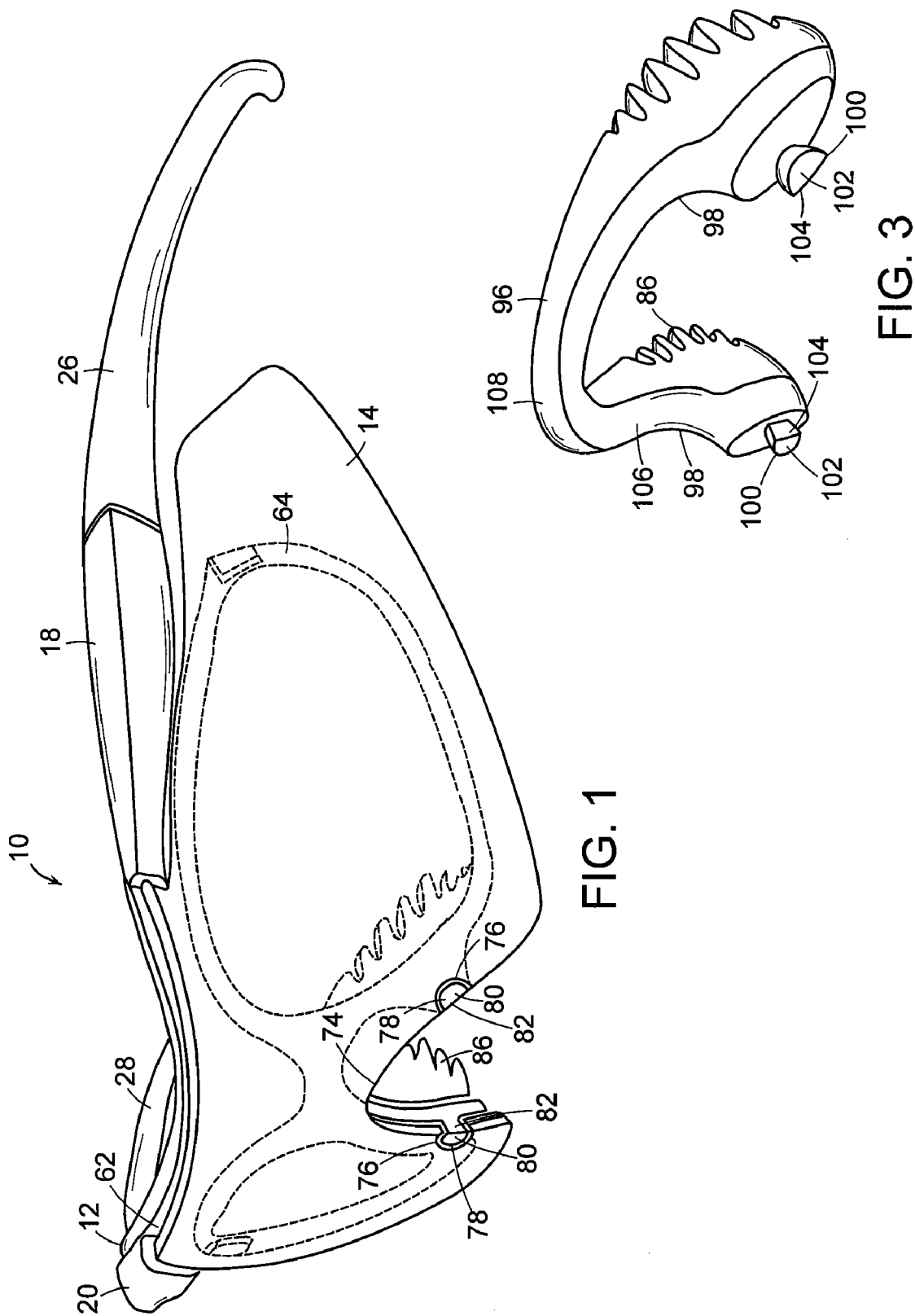
FIG. 1 is a perspective view of an embodiment of eyewear with an outer lens and an inner lens.

The figures referred to above are not drawn necessarily to scale and should be understood to provide a representation of the invention, illustrative of the principles involved. Some features of the eyewear depicted in the drawings have been enlarged or distorted relative to others to facilitate explanation and understanding. The same reference numbers are used in the drawings for similar or identical components and features shown in various alternative embodiments. Eyewear as disclosed herein would have configurations and components determined, in part, by the intended application and environment in which they are used.

DETAILED DESCRIPTION OF CERTAIN PREFERRED EMBODIMENTS

Figure 2:
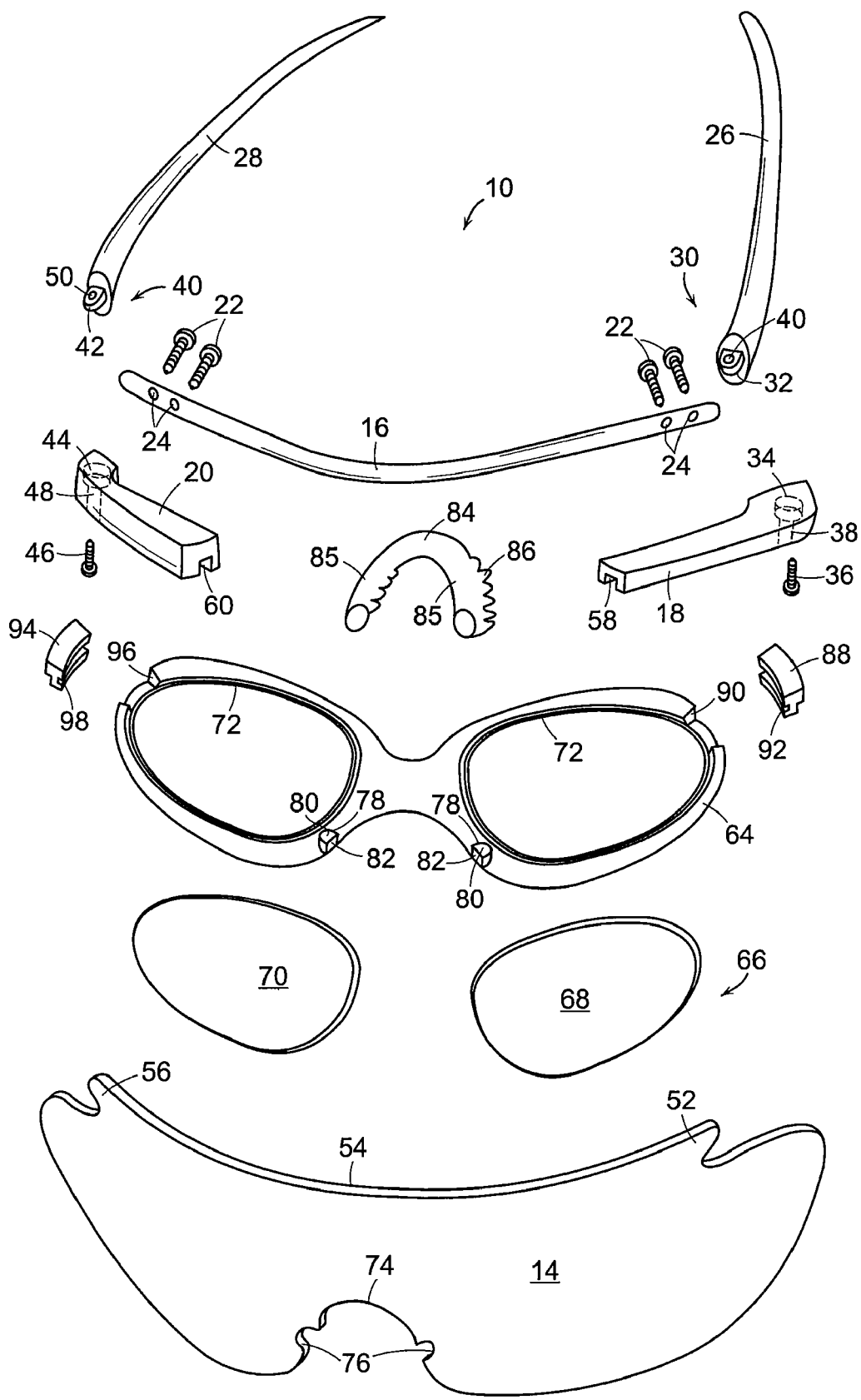
FIG. 2 is an exploded view of the eyewear of FIG. 1.

The present invention may be embodied in various forms. A preferred embodiment of eyewear 10 is shown in FIGS. 1-2. In particular, the embodiments depicted herein illustrate use of the present invention as performance sunglasses, often used by bicycle riders and runners, with an accompanying prescription lens. However, it is to be appreciated that eyewear 10 is meant to include not only performance sunglasses, but rather, all types of glasses, including, for example, safety glasses.

Certain directional terms used herein refer to directions with respect to the wearer of eyewear 10. Thus, the terms outward, outwardly, forward, and forwardly, as used herein, refer to a surface facing away from, or a direction extending away from, or an element spaced from the face of a wearer of eyewear 10. The terms inward, inwardly, rear, and rearwardly refer to a surface facing toward, or a direction extending toward, the face of a wearer of eyewear 10. The terms left and right are considered to be with respect to the wearer of eyewear 10. Thus, the left side of eyewear 10 would be to the right as seen in FIGS. 1-2, while the right side of eyewear 10 would be to the left as seen in FIGS. 1-2.

Eyewear 10 includes an outer frame 12 and a first or outer lens 14 secured to outer frame 12. Outer frame 12 may be formed of a rigid material, for example, a fiber-reinforced material such as a carbon fiber composite, providing a rigid structure and support for outer lens 14. In other embodiments, outer frame 12 may be formed of plastic, or a rubber coated core material, such as metal or plastic. Other suitable materials for outer frame 12 will become readily apparent to those skilled in the art, given the benefit of this disclosure.

In certain embodiments, outer frame 12 includes a central member 16 which may be curved rearwardly in order to match the contour of the forehead of the wearer of eyewear 10. Outer frame 12 includes a left connecting member 18 at the left end of central member 16 and a right connecting member 20 at a right end of central member 16. In the illustrated embodiments, left connecting member 18 and central member 16, and right connecting member 20 and central member 16, are separate elements secured to one another. In other embodiments, left connecting member 18 and central member 16 may be of unitary, that is, one-piece, construction with one another. Similarly, right connecting member 20 and central member 16 may also be of unitary, that is, one-piece, construction with one another.

Left and right connecting members 18, 20 are secured to central member 16 via screws 22 that extend through apertures 24 formed in central member 16, and which are threadingly received in corresponding recesses (not shown) in left and right connecting members 18, 20. It is to be appreciated that left and right connecting members 18, 20 may be secured to central member 16 by any other suitable fastening means, including, for example, rivets or adhesive.

A first or left temple arm 26 is secured to left connecting member 18. Similarly, a second or right temple arm 28 is secured to right connecting member 20. In certain embodiments, left temple arm 26 is pivotally secured to left connecting member 18, and right temple arm 28 is pivotally secured to right connecting member 20. In other embodiments, it is to be appreciated that left temple arm 26 and right temple arm 28 may be rigidly secured to outer frame 12, or they may be of unitary construction with outer frame 12.

Temple arms 26, 28 and connecting members 18, 20 may be formed of any suitable material, including, for example, plastic, or a rubber coated core material, such as metal or plastic. In certain preferred embodiments, temple arms 26, 28 and connecting members 18, 20 are formed of a flexible, resilient material, such as beta titanium. In other embodiments, temple arms 26, 28 and connecting members 18, 20 may be formed of a rigid material, such as a fiber-reinforced material, e.g., a carbon fiber composite. Other suitable materials for temple arms 26, 28 and connecting members 18, 20 will become readily apparent to those skilled in the art, given the benefit of this disclosure.

In the illustrated embodiment, a hinge 30 pivotally connects left temple arm 26 to left connecting member 18. Hinge 30 includes a tab 32 that extends outwardly from left temple arm 26 and which is received in a slot or recess 34 formed in left connecting member 18. A fastener such as a pin or screw 36 extends through an aperture 38 formed in left connecting member 18 and an aperture 40 formed in tab 32, thereby pivotally securing tab 32 within recess 34.

Similarly, a hinge 40 pivotally connects right temple arm 28 to right connecting member 20. Hinge 40 includes a tab 42 that extends outwardly from right temple arm 28 and which is received in a recess 44 formed in right connecting member 20. A fastener such as a pin or screw 46 extends through an aperture 48 formed in right connecting member 20 and an aperture 50 formed in tab 42, thereby pivotally securing tab 42 within recess 44. It is to be appreciated that fasteners 36, 46 may be bolts or rivets or any other suitable fastener that will adequately pivotally secure tabs 32, 42 to left and right connecting member 18, 20, respectively.

Outer lens 14 is secured to outer frame 12 by way of left connecting member 18 and right connecting member 20. A first tab 52 is formed on an upper edge 54 of outer lens 14 proximate its left side, and a second tab 56 is formed on upper edge 54 proximate the right side of outer lens 14. First tab 52 is received in a first slot 58 formed in left connecting member 18, and second tab 56 is received in a second slot 60 formed in right connecting member 20. Outer lens 14 can be easily pressed into snap-fit engagement with left and right connecting members 18, 20 by pushing first and second tabs 52, 56 into first and second slots 58, 60, respectively, and pulled from such engagement by pulling tabs 52, 56 out of slots 58, 60, thereby allowing a user to very quickly and easily replace outer lens 14 with an alternative or replacement lens.

As can be seen in the embodiment illustrated in FIG. 1, outer lens 14 may be secured to left and right connecting members 18, 20 such that upper edge 54 of outer lens 14 is spaced from center member 16 by a continuous gap 62 extending along the length of upper edge 54. Gap 62 provides ventilation for eyewear 10 between outer lens 14 and center member 16, reducing the chance of fogging of outer lens 14.

An inner frame 64 is positioned inwardly of outer lens 14. An inner lens 66 is secured within inner frame 64. In the illustrated embodiment, inner lens 66 is formed of a left inner lens 68 and a right inner lens 70. Inner lens 66 is captured in snap-fit fashion within a lens groove 72 formed in inner frame 64, thereby allowing inner lens 66 to be removed and replaced. In certain embodiments, inner lens 66 is a prescription lens, allowing a user to wear a lens outfitted with their prescription while receiving the benefits of outer lens 14, e.g., sun and wind protection. Inner frame 64 may be formed of plastic, e.g., nylon, metal, or any other suitable material. Although inner lens 66 is depicted here as being formed of two lenses, it is to be appreciated that in certain embodiments, inner lens 66 could be a single lens.

In certain embodiments, inner frame 64 is secured to a central lower portion of outer lens 14. In the embodiment illustrated in FIGS. 1-2, an inverted V-shaped recess 74 is formed in the central lower portion of outer lens 14. A notch 76 is formed in each side of recess 44, and inner frame 64 is secured to outer lens 14 by way of notches 76. In certain embodiments, notches 76 have a substantially semi-circular shape.

A pair of projections 78 extends outwardly from a front of inner frame 64. In certain embodiments, projections 78 are frustoconical members with an outer surface 80 that is substantially flush with the exterior surface of outer lens 14 when projections 78 are captured within notches 76, as seen in FIG. 1. A planar surface 82 extends inwardly from outer surface 80 of each projection 78, and is substantially flush with the surface of recess 74 when projections 78 are captured within notches 76, as seen in FIG. 1.

In certain embodiments, a nosepiece 84 is secured to a rear surface of inner frame 64. Nosepiece 84 is an inverted V-shaped member having a pair of arms 85. Nosepiece 84 may be secured to inner frame 64 by adhesive, or by fasteners, such as screws or rivets. In other embodiments, nosepiece 84 may be unitary, that is, of one-piece construction, with inner frame 64. A plurality of rearwardly extending fins 86 may be formed on a rear surface of nosepiece 84. Fins 86 rest on the bridge of the user's nose when eyewear 10 is worn by the user, and provide a positive gripping surface, reducing the chance of eyewear 10 slipping off the user's nose, and also provide additional ventilation. Nosepiece 42 may be formed of rubber, which serves to provide good grip, plastic, or any other suitable material.

To attach inner frame 64 to outer lens 14, a user grasps arms 85 of nosepiece 84 and squeezes them together. Inner frame 64 is then positioned such that projections 78 are aligned with notches 76, and nosepiece 84 is released, allowing projections 78 to engage within notches 76. To remove inner frame 64, the user simply grasps arms 85 and squeezes them together, thereby releasing projections 78 from their engagement with notches 76.

A first bumper pad 88 is positioned in a first recess 90 formed in the left side of inner frame 64 proximate its upper edge. A lens groove 92 is formed in first bumper pad 88 and cooperates with lens groove 72 of inner frame 64 to receive left inner lens 68. The engagement of left inner lens 68 with lens groove 92 captures first bumper pad 88 and retains it within first recess 90. It is to be appreciated that first bumper pad 88 could be secured to inner frame 64 with adhesive or other suitable fastening means.

A second bumper pad 94 is positioned in a second recess 96 formed in the right side of inner frame 64 proximate its upper edge. A lens groove 98 is formed in second bumper pad 94 and cooperates with lens groove 72 of inner frame 64 to receive right inner lens 70. The engagement of right inner lens 70 with lens groove 72 of inner frame 64 and lens groove 98 captures second bumper pad 94 and retains it within second recess 96. It is to be appreciated that second bumper pad 94 could be secured to inner frame 64 with adhesive or other suitable fastening means.

First and second bumper pads 88, 94 serve to space inner lens 64 from the inner surface of outer lens 14, thereby minimizing the possibility of scratching or otherwise marring the surface of outer lens 14. First and second bumper pads 88, 94 may be formed, for example, of a resilient material such as rubber, any elastomer, silicone, or any soft durometer resin. Other suitable materials for first and second bumper pads 88, 94 will become readily apparent to those skilled in the art, given the benefit of this disclosure.

A second nosepiece 96 is seen in FIG. 3. Nosepiece 96 is also an inverted V-shaped member having a pair of arms 98. A frustoconical projection 100 is formed at the end of each arm 98. Second nosepiece 96 can be attached to outer lens 14 in circumstances where inner frame 64 and inner lens 66 are not used, e.g., when a user has contacts in their eyes and does not need to use the prescription of inner lens 66. An outer surface 102 of each projection 100 is substantially flush with the exterior surface of outer lens 14 when projections 100 are captured within notches 76. A planar surface 104 extends inwardly from outer surface 102 of each projection 100, and is substantially flush with the surface of recess 74 when projections 100 are captured within notches 76. In certain embodiments, second nosepiece 96 is formed of a first outer portion 106 and a second inner portion 108, with outer portion 106, which includes projections 100, being formed of a harder material than that of inner portion 108. Outer portion 106 may be formed of a substantially rigid material, e.g., plastic, while inner portion 108, which includes fins 86 may be formed of a resilient material, as described above with respect to nosepiece 84. Second nosepiece 96 may be used at times when the user has contacts in their eyes, and does not need to use the prescription lenses provided in inner frame 64.

Figure 4:
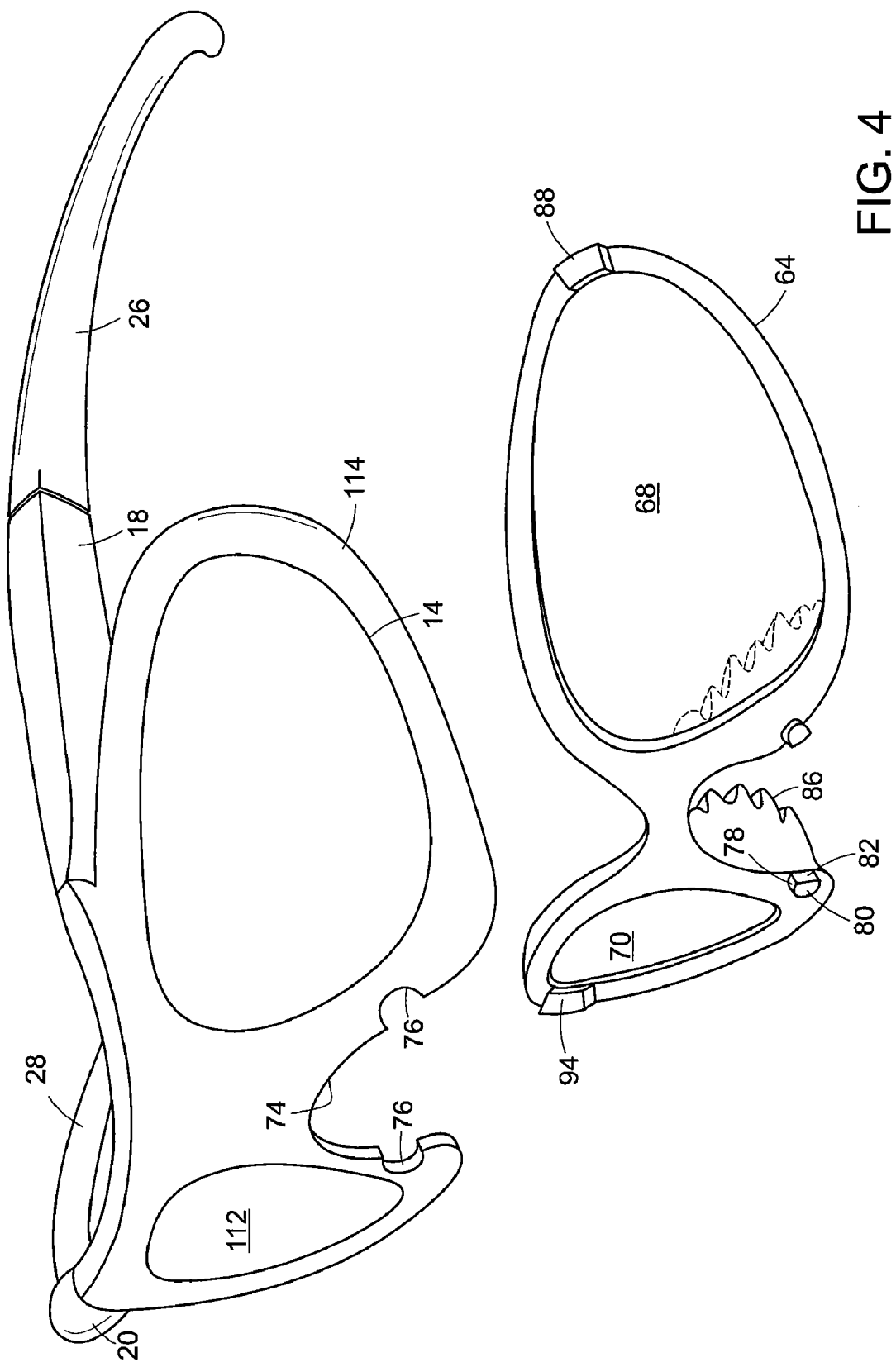
FIG. 4 is an exploded view of an alternative embodiment of eyewear with an outer lens and an inner lens.

Although outer lens 14 is shown here as a single lens secured to outer frame 12, it is to be appreciated that in certain embodiments, outer lens 14 may comprise two separate lenses. For example, as seen in FIG. 4, outer lens 14 may be formed of a left lens 110 and a right lens 112 mounted in an outer frame 114. Inner frame 64 is mounted to outer frame 114 by way of projections 78 and notches 76 in the same manner described above with respect to outer frame 12.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. Eyewear comprising, in combination:
    an outer frame having a right temple arm and a left temple arm;
    an outer lens secured to the outer frame;
    a pair of notches formed in one of the outer frame and the outer lens;
    an inner frame having a pair of projections, each of the projections being removably received in one of the notches;
    an inner lens having a nosepiece secured thereto and being-secured to the inner frame.

2. The eyewear of claim 1, wherein the nosepiece includes a plurality of rearwardly projecting fins.

3. The eyewear of claim 1, wherein the nosepiece is formed of a resilient material.

4. The eyewear of claim 1, wherein the outer frame comprises a central member, the right temple arm and left temple arm being connected to the central member.

5. The eyewear of claim 4, wherein the right temple arm and left temple arm are pivotally connected to the central member.

6. The eyewear of claim 5, further comprising:
    a first recess formed in the outer frame;
    a second recess formed in the outer frame;
    a first tab formed on the right temple arm and received in the first recess, the first tab being pivotally secured to the outer frame; and
    a second tab formed on the left temple arm and received in the second recess, the second tab being pivotally secured to the outer frame.

7. The eyewear of claim 6, wherein the outer frame includes a left connecting member and a right connecting member secured to the central member, the first recess being formed in the left connecting member and the second recess being formed in the right connecting member, and the first tab being pivotally secured to the left connecting member and the second tab being pivotally secured to the right connecting member.

8. The eyewear of claim 1, wherein the inner lens comprises a left lens and a right lens.

9. The eyewear of claim 1, wherein the outer lens includes a pair of notches, each notch receiving a corresponding projection.

10. The eyewear of claim 1, wherein the inner frame includes a lens groove configured to receive the inner lens.

11. The eyewear of claim 1, further comprising a first bumper pad positioned between the inner frame and the outer lens proximate the left temple arm, and a second bumper pad positioned between the inner frame and the outer lens proximate the right temple arm.

12. The eyewear of claim 11, wherein the first and second bumper pads are secured to the inner frame by engagement of the inner lens and the inner frame.

13. The eyewear of claim 11, wherein each of the first and second bumper pads includes a lens groove configured to receive a portion of the inner lens.

14. The eyewear of claim 1, further comprising a nosepiece configured to be removably secured to one of the outer frame and the outer lens.

15. The eyewear of claim 1, wherein the inner lens is a prescription lens.

16. Eyewear comprising, in combination:
    an outer frame comprising:
        a central member;
        a left connecting member secured to the central member;
        a left temple arm secured to the left connecting member;
        a right connecting member secured to the central member; and
        a right temple arm secured to the right connecting member;
    an outer lens secured to the left connecting member and the right connecting member;

a first bumper pad positioned between the inner frame and the outer lens proximate the left temple arm, and a second bumper pad positioned between the inner frame and the outer lens proximate the right temple arm;

an inner frame removably secured to the outer lens; and an inner lens having a nosepiece secured thereto and being secured to the inner frame.

17. The eyewear of claim 16, wherein the left temple arm is pivotally secured to the left connecting member and the right temple arm is pivotally connected to the right connecting member.

18. The eyewear of claim 16, wherein the inner lens comprises a left inner lens and a right inner lens.

19. The eyewear of claim 16, wherein the inner frame includes a lens groove, the inner lens being received in the lens groove.

20. The eyewear of claim 16, wherein the first and second bumper pads are secured to the inner frame by engagement of the inner lens and the inner frame.

21. The eyewear of claim 16, wherein each of the first and second bumper pads includes a lens groove configured to receive a portion of the inner lens.

22. Eyewear comprising, in combination:

an outer frame comprising:
- a central member;
- a left connecting member secured to the central member;
- a left temple arm pivotally secured to the left connecting member;
- a right connecting member secured to the central member; and
- a right temple arm pivotally secured to the right connecting member;

an outer lens removably secured to the left connecting member and the right connecting member;

an inner frame removably secured to the outer lens; and a left inner lens removably secured to the inner frame;

a right inner lens removably secured to the inner frame;

a nosepiece secured to the inner frame;

a left bumper pad positioned between the inner frame and the outer lens; and a right bumper pad positioned between the inner frame and the outer lens.

* * * * *